United States Patent [19]

Fischel et al.

[11] Patent Number: 4,871,462

[45] Date of Patent: * Oct. 3, 1989

[54] ENHANCED SEPARATION OF BLOOD COMPONENTS

[75] Inventors: Richard J. Fischel, Minneapolis, Minn.; Albert V. Shatzel, Glenview, Ill.

[73] Assignee: Haemonetics Corporation, Braintree, Mass.

[*] Notice: The portion of the term of this patent subsequent to Jul. 5, 2005 has been disclaimed.

[21] Appl. No.: 58,549

[22] Filed: Jun. 5, 1987

Related U.S. Application Data

[63] Continuation-in-part of Ser. No. 812,936, Dec. 23, 1985, Pat. No. 4,755,300.

[51] Int. Cl.[4] .............................................. B01D 13/00
[52] U.S. Cl. .............................. 210/651; 210/321.64; 210/321.68; 210/321.87; 210/324; 210/335; 210/360.1; 210/782; 210/806; 422/101; 436/178
[58] Field of Search ................ 210/90, 321.6, 321.63, 210/321.64, 321.65, 321.67, 321.68, 321.82, 321.87, 359, 360.1, 483, 497.01, 497.3, 512.1, 650, 652, 748, 780, 781, 782, 324, 335, 806, 651; 55/52, 159, 199; 422/101; 436/177, 178

[56] References Cited

U.S. PATENT DOCUMENTS 4,212,742  7/1980  Solomon et al. .................... 210/346
4,755,300  7/1988  Fischel et al. ...................... 210/650

FOREIGN PATENT DOCUMENTS

0112152  6/1984  European Pat. Off. .
8502783  7/1985  PCT Int'l Appl. .
8801193  2/1988  PCT Int'l Appl. .
8801194  2/1988  PCT Int'l Appl. .

Primary Examiner—W. Gary Jones
Attorney, Agent, or Firm—William W. Haefliger

[57] ABSTRACT

A method of separating blood plasma from particles including blood cells, in the blood, includes the steps:
(a) providing a membrane with holes therethrough of a size to pass the particulate, and supplying blood to one side of the membrane,
(b) moving the membrane at sufficiently high velocity that shear conditions created in the blood adjacent the membrane cause particles in the blood to move or remain away from the surface of the membrane and from the holes,
(c) creating a pressure differential across the membrane sufficient to cause plasma to pass through the holes from said one side of the membrane to the opposite side thereof,
(d) the holes being allowed to reduce in cross-sectional area as by protein collection on the membrane at the holes, or by expansion of the membrane material, and the holes maintained sufficiently open, by virtue of their original size, to continue to pass the plama therethrough.

7 Claims, 8 Drawing Sheets

ENHANCED SEPARATION OF BLOOD COMPONENTS

This application is a continuation-in-part of Ser. No. 812,936, filed Dec. 23, 1985, now U.S. Pat. No. 4,755,300.

BACKGROUND OF THE INVENTION

This invention relates generally to the separation or filtration of blood components, and more particularly concerns improvements in method and apparatus employing permeable membranes to achieve such separation.

When membranes are employed to filter blood, i.e. to separate liquid such as plasma from particulate, as for example, red blood cells, or platelets, it is found that the flow through membrane openings tends rapidly to reduce over time, such openings initially being sized to block passage of the particulate, to provide filtering. Efforts to prevent such flow reduction due to clogging of the membrane have included increasing the membrane area, the shear rate of the flowing blood, and/or the pressure differential across the membrane so as to delay the clogging effect or to drive the fluid component of the blood through partially clogged perforations.

Viscous shear conditions in the blood flowing over a membrane create dynamic forces opposing particulate flow toward the perforations or holes through the membrane; however, flow toward and through the holes tends to drag particulate toward and into the openings. At the so called critical filtration velocity, such dynamic forces and the opposing drag forces are in balance, whereby particles are not displaced toward or away from the holes; at filtration velocities higher than critical, the red cells tend to approach the perforations essentially piling up on the membrane ("polarization"), and at filtration velocities lower than critical, the red cells or subject particulates tend to remain spaced from the membrane. The critical filtration velocity is different for different size particles, increasing approximately as the square of particle diameter. Above the critical filtration velocity and in the polarized condition wherein blood cells form a concentrated layer over the membrane surface the flow of filtrate, i.e., plasma is substantially reduced for two reasons. The most apparent one is that plasma must flow past a dense matrix of cells in order to reach the membrane. The second, less obvious, reason is that the maintenance of uncontaminated plasma flow becomes exquisitely sensitive to transmembrane pressure (TMP). If TMP exceeds a very low threshold, usually only 50 to 100 mm Hg. the blood cells overlying the membrane pores will be deformed and forced into and extruded through the pores causing undesirable blood cell damage (hemolysis) and accelerated plugging of the pores. Consequently, the obligatory low TMP fundamentally limits the flow of plasma through the membrane.

Even below the critical filtration velocity and despite higher permissible differential pressures across the membrane in the absence of polarization, pore openings, sized to hold back the blood cells or retain particulates in general, tend to become clogged due either to protein interaction with the membrane, e.g., coating, or simply swelling of the membrane substrate, thus, progressively reducing filtering efficiency and filtrate production. In this regard, filtration velocity refers to average flow rate per unit portion of membrane area rather than actual velocity within a pore. Clearly, there is need for material and means to prevent or reduce the membrane hole or pore clogging tendency.

SUMMARY OF THE INVENTION

It is a major object of the invention to provide a solution to the above problems and difficulties. Basically, applicants have discovered a method of separating blood plasma, or liquid, from particles including red cells, in whole blood, which overcomes membrane hole clogging and the effects of polarization. That method may be considered to include the following steps:

(a) providing a membrane with holes therethrough of a size to pass rather than retain the particulate, and supplying blood in a layer of finite thickness to one side of the membrane, (b) relatively moving the membrane or the blood at sufficiently high velocity in relation to blood film thickness that shear conditions created in the blood adjacent the membrane cause the particles in the blood to move or remain away from the surface of the membrane and from said holes, (c) creating a pressure differential across the membrane sufficient to cause plasma to pass through the holes from said one side of the membrane to the opposite side thereof, (d) the holes being allowed to reduce in cross-sectional area as by protein collection on the membrane at the holes, or by expansion of the membrane material and the holes maintained sufficiently open, by virtue of their size, to continue to pass the plasma therethrough, without plugging.

In accordance with the above method, it is found that an increase in pressure differential across the membrane does not cause polarization at the membrane holes, and more significantly and surprisingly, even though the hole or pore sizes are maintained such as to pass, not restrict, the passage of red cells or other particulate, yet these red cells and particulates do not pass through the pores. Typically, such hole sizes are provided to have cross dimension or dimensions in excess of 0.9 microns. In this regard, those skilled in the art have in the past considered that the hole sizes should not exceed about 0.6 to 0.8 microns in order to prevent red cell passage. This was considered critical in the past, in view of the polarization of blood cells on the membrane surface and the pressure differentials used to force liquid across the polarized layer and through the holes, which pressure also tends to force cells through the holes, and also in view of the progressively greater density of red cells, i.e., increasing hematocrit in the blood closer to the outlet from the zone adjacent the membrane due to the withdrawal of plasma therefrom with concomitant greater risk of red cell passage through the holes unless they were sized to block such red cell passage.

Applicants herein have discovered that the rate of movement, such as radians per second rotation, of the membrane, may be controlled at a level or levels such that the flow of plasma through the membrane remains below the critical filtration velocity, so as to prevent particulate flow through the "large" holes which are sized to otherwise pass such particulate. As an example, such rotation is controlled so as to produce shear rates in the blood at levels in the range between 5,000 to 100,000 inverse seconds, sec.$^{-1}$ and preferably between 30,000 down to 8,000 sec.$^{-1}$ in the case of typical whole blood being thickened to a hematocrit of about 0.8, respectively, the membrane being of "NUCLEPORE" type having about 10 microns thickness, and having overall frusto-conical shape. Such a membrane tends to become expanded within the chemically altered pores when wetted, reducing the sizes of the holes or pores; and protein tends to deposit or collect at the walls of the openings; however, if the holes are initially "oversized" as referred to, and if the rate of rotation of the frusto-conical membrane about its axis is controlled, as referred to, plasma flow reduction due to clogging of the pores or holes can be and is eliminated.

These and other objects and advantages of the invention, as well as the details of an illustrative embodiment will be more fully understood from the following specification and drawings, which:

DETAILED DESCRIPTION

Figure 1:
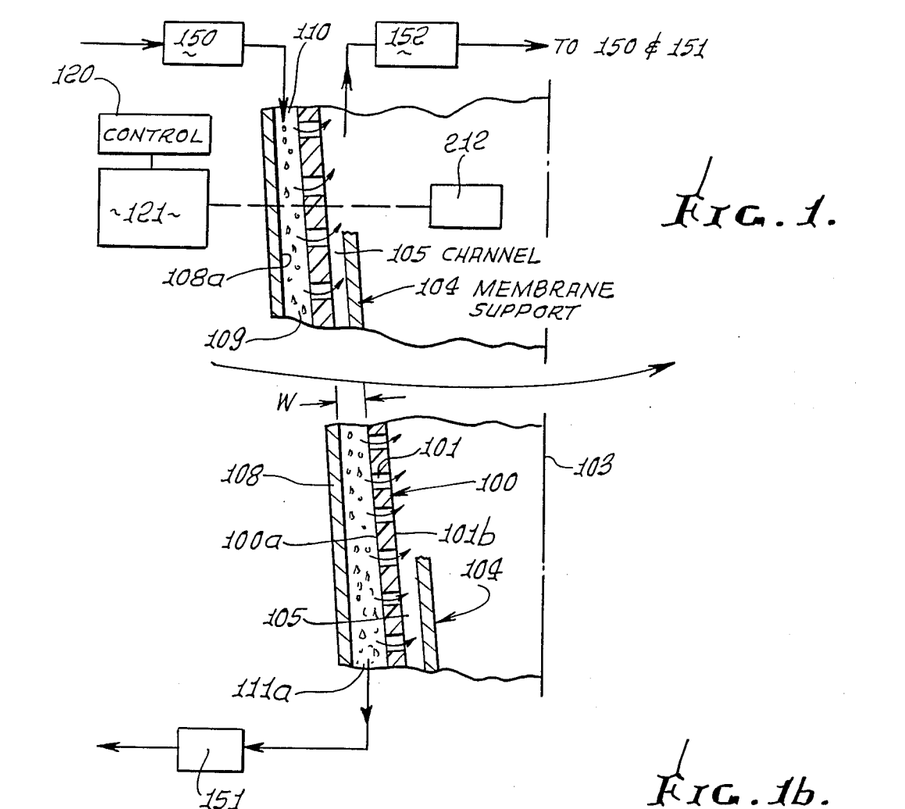
FIG. 1 is an elevation, in section, showing one form of the invention.
Figure 1A:
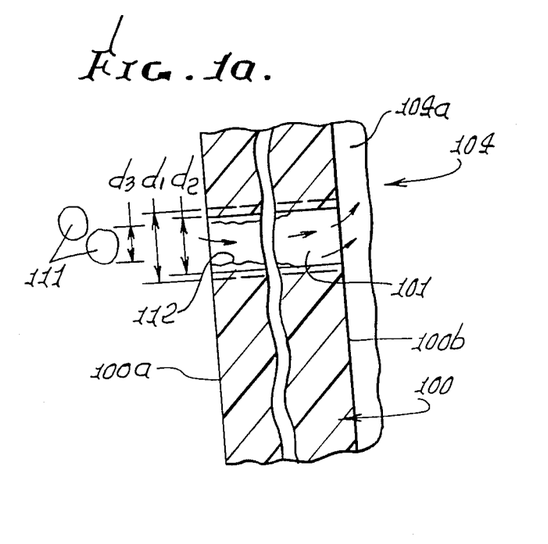
FIG. 1a is an enlarged section in elevation, showing membrane pore details.

Referring to FIGS. 1 and 1a a membrane 100 is provided to have holes 101 distributed over its area, and extending through its thickness between opposite sides 100a and 100b. The membrane may advantageously have frustoconical shape, for rotation about the frustum axis 103, on a frusto conical support 104 to which the membrane is loosely attached. The support is shown as provided with channels 105 in communication with holes 101, and to which the liquid flow filtrate (indicated by arrows 106) passes for travel in the channels toward upper outlet 107. Support 104 engages the membrane at locations between the channels. Note in FIG. 1 that an annular casing 108 surrounds the rotating membrane, and a gap 109 is provided between the membrane outer surface or side 100a and the inner surface 108a of the casing. The gap is annular, but its width "w" increases progressively in a direction axially lengthwise of the membrane between whole blood supply entrance 110 to the gap and elevated hematocrit outlet 111a from the gap, for reasons as will appear.

In accordance with an important aspect of the invention, the holes through the membrane are of a size to pass the particulate. See for example the nominally cylindrical wall holes in FIG. 1a having diameters "$d_2$" these being greater than the effective cross dimension $d_3$ of the red blood cells indicated at 111. It is understood that red blood cells are highly deformable so that $d_3$ refers to that dimension through which a red cell could pass without damage to its structure. Another, equally important, way to characterize the size of a blood cell is in terms of the size of a pore that would allow it to pass, under polarized membrane conditions, at such a low TMP that the permeate or plasma flow therethrough would be unacceptably low. This would correspond to pore diameters of 0.9 microns or larger. In this regard, the hole nominal dimensions prior to operation of the membrane, and prior to wetting of the membrane are indicated at $d_1$, where $d_1$ is greater than $d_2$. Thus, the following relationships exist:

$d_1 > d_2$ and $d_1 > d_3$, initially;

$d_2 \geq d_3$, ultimately

Figure 1B:
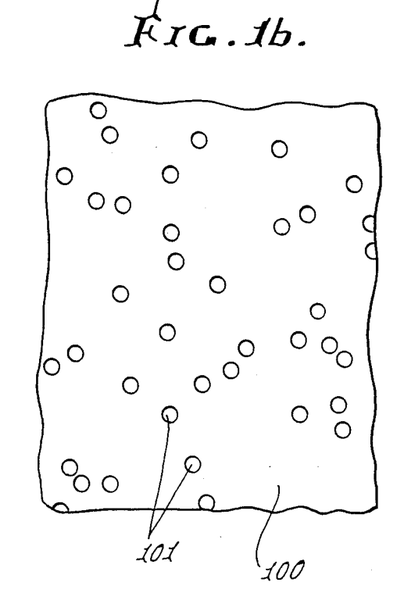
FIG. 1b is an enlarged plan view showing typical structure of a membrane.

The membrane is typically of "NUCLEPORE" type produced by Nuclepore Corporation by a process of irradiation and etching, and is of polycarbonate or polyester composition, it being found that the membrane expands at least within the pore passages, when wetted, i.e. during filtering operation, whereby the holes reduce in nominal diameter to $d_2$. FIG. 1b is a frontal view of such a filter membrane, greatly enlarged. Pore density ranges from about $8 \times 10^6$ to $1 \times 10^5$ pores per square centimeter, and the pores are randomly distributed. See FIG. 1b.

FIG. 1a also shows protein deposition at 112, i.e. clinging to the inner surface of a typical hole 101, which further gradually reduces its diameter, over time. In accordance with the invention, account is taken for both hole size reduction to $d_2$ and protein build up, so that the hole will remain at least sufficiently open to pass the plasma liquid filtrate flow 106 over relatively long periods of time, as for example at least 60 minutes, and without total plugging, despite these hole size reducing circumstances, and during membrane rotation. Such rotation, or other relative movement parallel to the membrane outer surface, is carried out at sufficiently high velocity that shear conditions created in the blood adjacent the membrane cause particles, including red blood cells, to move or remain away from the surface of the membrane and from the holes, throughout the membrane effective axial length. In this regard, as the blood flows toward the outlet 111a (typically in a spiral path about axis 103 due to membrane rotation) the concentration of red blood cells and other particulate tends to increase in the gap 109; however, this effect, which would otherwise cause red blood cell damage due to high shear stress associated with high shear rate and increasing blood viscosity is mitigated by progressively increasing the gap width in the direction toward the outlet, as referred to above, thus reducing the shear rate there; whereby the cells and other particulate can be kept away from the large "non-plugging" holes 101, which would otherwise pass through them with the filtrate while simultaneously avoiding blood cell damage as the shear stress does not increase with increasing blood viscosity. The gap width increases from about 0.01 inches near the inlet 110 to about 0.025 inches near outlet 111, in order to effect this result while removing plasma from typical normal blood.

In order to obtain these conditions, the hole nominal cross dimension $d_1$ should exceed 0.9 microns; the speed of either membrane, or facing surface, rotation and the blood film thickness, or gap width, need not be specified individually but, taken in combination should produce a blood shearing rate lying within the range of 5,000 sec.$^{-1}$ for the thickest, i.e., highest hematocrit blood to 100,000 sec.$^{-1}$ for blood having low concentrations of red blood cells, i.e. below 0.01 hematocrit. Once the gap width profile has been incorporated into the device structure the speed of rotation can be controlled so as to operate within the appropriate range of shear rates for the blood being separated. See for example the control 120 for the rotary magnetic drive of the membrane support, that drive including outer member 121 creating a rotating magnetic field, and inner magnet 212 carried by support 104. More specifically, the shear rate or speed of membrane rotation should preferably lie within the range of about 30,000 sec.$^{-1}$ for entering normal blood to about 8,000 sec.$^{-1}$ for exiting thickened blood. Also the shear stress to which the blood is subjected during plasma extraction should be kept approximately constant and at a nominal value less than 1,500 dynes per square centimeter over the entire actively filtering area of the membrane.

Shear rate is closely approximated by dividing the membrane surface velocity by the radial gap dimension. Laminar relative flow conditions are to be maintained in the blood adjacent the membrane surface 100a. Tests within these parameters (0.9 up to 12 micron hole dimension, and shear rates from 8,000 to 30,000 sec.$^{-1}$) have been carried out employing membranes of 10 microns thickness, and the holes did not plug up over intervals of use time in excess of 60 minutes. Typically, about 45 to 60 milliliters per minute of plasma are passed by the filter membrane having an active area of 40 cm$^2$.

Figure 2:
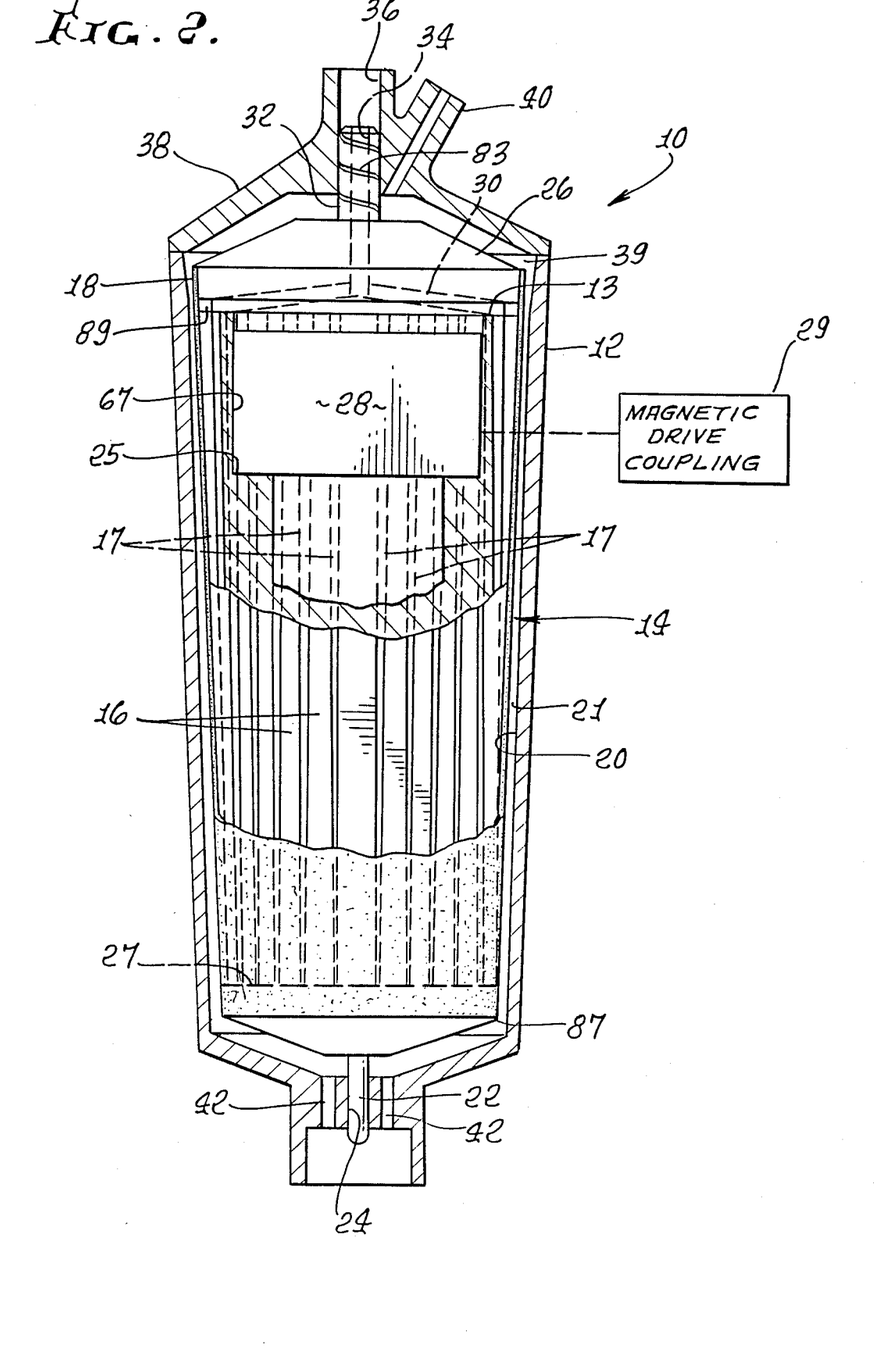
FIG. 2 is an elevation in section showing test apparatus.
Figure 3:
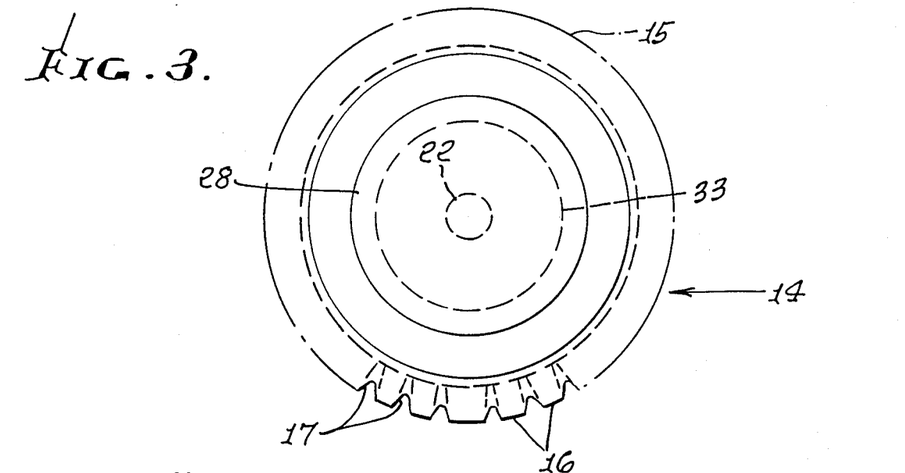
FIG. 3 is a cross section showing membrane support structure in the test apparatus.

Such tests were carried out using membrane filtration apparatus like that at 10 as shown in FIG. 2. This apparatus is specifically intended for use in separating plasma from whole blood, for collecting the plasma and concentrated red blood cells after the separation has been accomplished, and for returning red blood cells to the donor after the plasma collection has been completed. As shown therein, the apparatus consists of a stationary elongated containment vessel 12 and an elongated rotatable spinner 14 disposed within vessel 12. The interior wall of vessel 12 has a tapering profile from top to bottom, and spinner 14 likewise has a tapering configuration which generally follows the interior taper of the vessel. As seen in FIGS. 2 and 3 the outer surface of spinner 14 is provided with multiple longitudinal channels 17 in the exterior surface of the spinner forming ribs 16 therebetween.

A porous semipermeable membrane 18 extends around and overlies the exterior surface of the spinner 14. The interior wall 20 of the containment vessel 12 is slightly concave inward in longitudinal profile giving the interior wall 20 an inverted approximately conical axial cross-section such that the spacing of inwardly facing wall 20 along its entire longitudinal extent from the straight outer surfaces as seen in longitudinal axial section, of the longitudinal ribs is maintained at a gap from the interior wall of the vessel and from the semipermeable membrane which is wrapped around the spinner. The thickness of the gap varies in the longitudinal direction and is maintained at a width at each point such that the shear stress to which the blood is subjected during the plasma extraction interval is maintained at an essentially constant value less than 1500 dynes/cm$^2$ over the entire length of the membrane surface in spite of the large increase in blood viscosity as the blood transits the length of the apparatus. Spinner 14 is rotatably mounted by means of pin 22 extending through aperture 24, which is molded into the base of the containment vessel.

A spinner cap 26 is located at the top of spinner 14 and is secured in an opening at the top of a cavity 39 in the interior of spinner 14. A four radial pole ceramic disk magnet 28 is mounted in cavity 39 below cap 26. Magnet 28 is bonded to the interior wall of the spinner. By means of a drive mechanism 29 magnetically coupled to magnet 28, spinner 14 is caused to rotate on its axis of rotation when the plasma separation apparatus 10 is operated. Note control 120 for the drive 29 to control the speed of rotation of the spinner. A series of conduits 30 functioning as a manifold extend from the recessed perimeter 37 of the spinner cap 26 to its axis. The recessed perimeter 37 of the spinner cap 26 forms a circumferential collection channel 89 at the ends of the channels 17 in spinner 14.

Conduits 30 communicate with and extend from the circumferential collection channel 89 formed between spinner 14 and cap 26 to an upwardly directed passage 34 in hollow pin 32, which may be integrally molded with cap 26. Containment vessel 12 is sealed by means of a cap 38 which defines an inlet port 40 where whole blood is introduced into the apparatus and an elongated, hollow conduit 36 which provides a radial bearing surface for pin 32 which is adapted to be slidably fitted therein. Conduit 36 is a first outlet port for plasma extracted from blood admitted to the apparatus. Ports 42 at the bottom of the unit serve as second outlet ports for removal of the concentrated red blood cells remaining after the plasma has been filtered out.

Inlet port 40 is also located in the top of cap 38 disposed at an angle with respect to the axis of the apparatus and is directed at the centerline of the upwardly directed hollow pin 32. Blood entering the apparatus flows into port 40 and against and along pin 32. Port 40 is utilized both as an inlet for the introduction of fluid suspensions such as whole blood into the device and an outlet for concentrated red blood cells suspended in remaining plasma and possibly additional isotonic saline solution when the device is operated with blood flow reversed.

The spinner element is shown in further detail in FIG. 3 which is a top plan view showing its exterior surface 15, into which ribs 16 and channels 17 are molded. Channels 17 narrow progressively from the top to the bottom of the spinner element, and the depths of these channels also diminishes over the longitudinal extent of the spinner element from the top to bottom thereof. One rib is wider than the rest of the ribs 16 on the exterior surface of the spinner, and provides a land or base to which the membrane is secured.

As can be seen in FIG. 2, the interior of the spinner element is hollow and has a stepped configuration which provides a shoulder 25 located in cavity 67 of the hollow spinner element. Shoulder 25 provides a shelf on which ceramic magnet 28 is seated. The bottom 27 of the interior of the spinner element is spaced approximately twice as far from shoulder 25 as the top surface 13 of the spinner element. Mounting pin 22 provides the axis about which the spinner element rotates.

As shown in FIG. 2, pin 22 is molded as an integral part of the spinner element. The perimeter of the bottom exterior surface of the spinner element is shown at 87 in FIG. 2, and the exterior surface of the bottom of the spinner element corresponds to the contour of the interior surface of the bottom of container vessel 12.

Figures 4, 5:
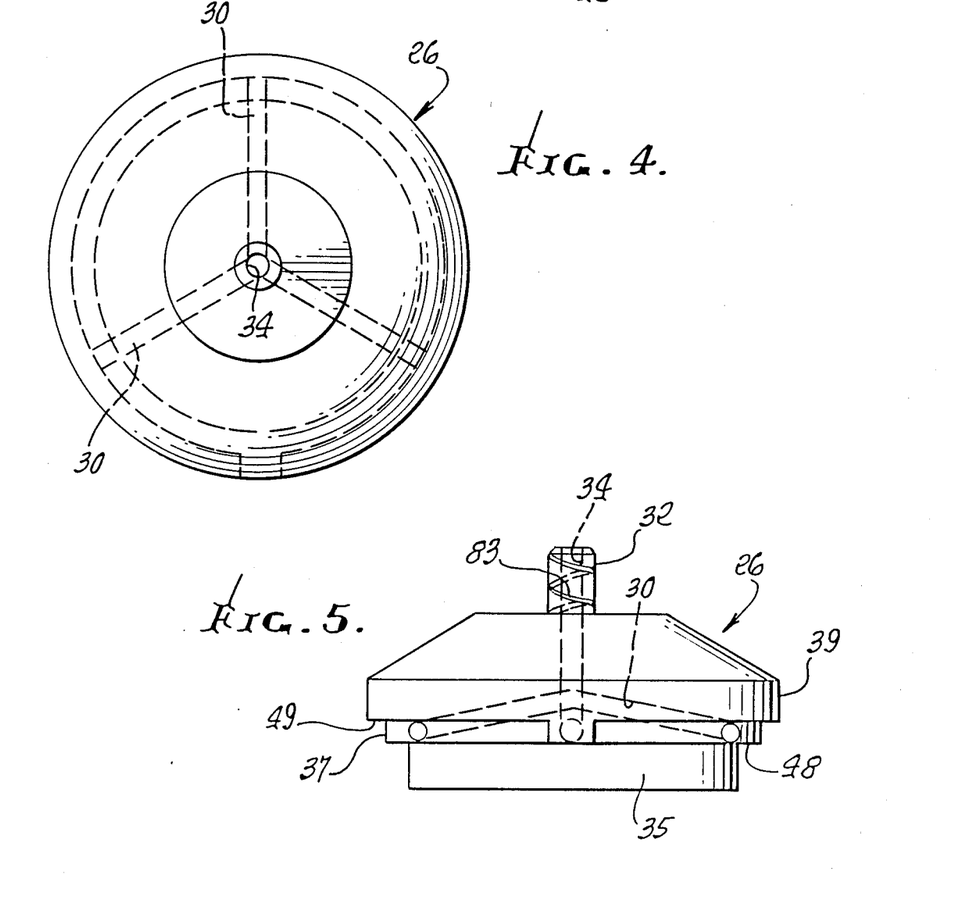
FIG. 4 is a cross section showing details of end cap structure in the test apparatus.
FIG. 5 is a side elevation of the FIG. 4 end cap structure.

The cap for spinner element 14 is shown in plan view in FIG. 4 and in elevation view in FIG. 5. The cap comprises a plug portion 35 at its base having a first diameter and intermediate circular portion 37 defining a shoulder 48 and a top portion 39 having a diameter greater than the diameter of intermediate portion 37 and defining a second shoulder 49. As shown therein, three ports 30 extend from the perimeter of intermediate portion 37 into the center interior element 14. Ports 30 communicate with passage 34 in hollow pin 32. As shown in FIG. 5, a shallow spiral groove 83 is imparted to the exterior surface of pin 32. Spinner 14 is arranged to rotate in a left-hand direction, groove 83 is left-handed, as shown. The groove exerts a pumping action on plasma emerging from passage 34. A minute amount of plasma is carried by groove 83 along the interior of sleeve 36 into the space above cap 26, thereby exerting a slight amount of pressure on the blood in said space, preventing its migration upwardly along the interior of sleeve 36.

When unit is assembled, spinner cap 26 is mounted on top of spinner element 14. Plug 35 is adapted to fit tightly within the opening at the top of spinner element 14 with shoulder 48 seated on top surface 13.

In the foregoing, it will be noted that applicants employ relatively low trans-membrane pressure, i.e. less than 50 mm. Hg, due to the exceptionally large pore diameters in the membrane. Consequently, the membrane which is loosely attached to its support is not pressed so tightly against the support as to drive away the underlying liquid film, which would otherwise prevent plasma flow between channels 105 adjacent inner surface 101b of the membrane, referred to generally as membrane masking. It is further noted that when operating below the critical filtration velocity as defined hereinabove, there is no polarization of cells on the membrane so that operation of the system does not require either limitation or control of TMP which is a serious complication and certainly a limitation in the operation and performance of membrane separation systems, heretofore. The preferred method of operation of the instant invention is, therefore, to control the volumetric flow of incompressible fluid, i.e., blood by means of positive displacement pumps connected to blood inlet and outlet, respectively, the difference being the collected plasma which is, in effect, pushed across the membrane. What is controlled by direct volumetric displacement is the plasma volumetric rate which can accordingly, be kept below the known and prescribed critical filtration velocity without any reference to TMP or need to measure or regulate that otherwise difficult parameter. Also, because the system is insensitive to TMP or variations thereof, it is not necessary to compensate for static pressure changes due to progressive reduction in pore diameter due to material accumulation or other progressive reduction in hole size. Thus the selected or varied (i.e. controlled) rate of rotation in combination with controlled plasma flow prevents red cell travel through the oversized holes, whereby complete hole clogging is avoided plus successful filtering of plasma from whole blood are achieved.

FIG. 1 also shows flow controls at 150 and 151 to control the amount of blood flowing into the gap (or zone), and out of the gap, and as related to velocity of the membrane, so as to prevent red cell passage through the membrane holes, and while obtaining maximum or near maximum plasma production. Also shown is a red cell detector 152 to detect the existence or non-existence of red cells in the produced plasma. The flow is controlled via 150 and 151 to reduce plasma flow if red cells are detected by detector 152.

From the above, the following can be stated:

1. If fluid is withdrawn from a suspension through porous media at less than the "critical filtration velocity" (CFV) the particles to which the latter applies will not tend to impinge the surface of the filtration media.

2. The critical filtration velocity can be raised for all particles by increasing the shear rate, but is otherwise lower for higher concentrations of particles.

3. The critical filtration velocity depends upon suspended particle size and, to some extent, on particle shape. The precise dependence is complex but CFV tends to increase approximately as the square of the effective particle radius, that is, the ⅔ power of particle volume. Particle density has negligible effect.

4. Sensitive particles such as formed components of blood, will be adversely affected or damaged if they are caused to pass through pore openings that require substantial deformation of such particles; whereas, if the pore opening is large enough to pass the particle without such deformation, as when the pore and particle cross-section are comparable or the pore is larger than the particle, then the particle will pass through such pore without adverse affect, or damage.

The following test objectives were established:

1. To demonstrate that pore sizes above 0.9 $\mu$m can be utilized as the filtration medium to separate blood plasma from whole blood, wherein the RBC's do not pass through the pores provided the CFV is not exceeded.

2. To use CFV itself as a means of specific component separation which separation is effected by particle size in relation to CFV. Those particles for which filtration velocity (FV) is above CFV pass through the pores, while those for which FV is below CFV are held back. Pore size is selected only on the basis of being large enough to allow those particles intended to pass through, to do so without damage.

3. Noting that CFV drops precipitously as remaining particle concentration increases, ways were sought to limit FV at those positions along the filtration medium at which particle concentration is increasing (i.e., toward the blood exit) so that FV nowhere exceeds CFV or, failing this selective limiting of FV as a function of position, either partially or altogether, then finding operational limits so that FV<CFV, everywhere.

The following experimental results were obtained:

1. Without independent means to limit FV where particle concentration is greater, as described, it is possible to obtain cell-free plasma, while extracting up to 80% of the available inflowing plasma up to a net mean FV of 1.5 cm/min., using rotation speeds of 5000 to 6000 r.p.m. and entering whole blood of 0.4 to 0.45 hematocrit corresponding to shear stress in the range of 1200 to 1500 dynes/cm$^2$, and also employing shear rates that varied from about 30,000 to 35,000 sec.$^{-1}$ at the whole blood entrance to about 10,000 to 12,000 sec.$^{-1}$ at the concentrated cell exit, provided that the pore size is 1.0 to 4.0 $\mu$m i.e. below 5.0 $\mu$m.

Within this pore size range, there is still enough tendency for the thickened blood to partially reduce the FV by limited membrane plugging to bring the local FV below the CFV at that position along the filter medium so that filtration without further plugging or cell exudation can proceed. This process was previously described in Ser. No. 812,936 as a self-limiting process which brought the actual local FV into equilibrium with the CFV that applies to the final equilibrium local particle concentration.

It was discovered that whenever the device is operated in a manner which causes a substantial increase in RBC concentration (e.g., as in plasma collection), the RBC tend to "pool" at the bottom of the device and are not easily swept away from the membrane if the latter terminates too close to the bottom. This raises the effective hematocrit inordinately at that lower portion of the membrane, with a consequent serious lowering of the CFV there. Thus, when cells do penetrate the membrane such penetration always occurs at that lower location. This problem was solved by incorporating a "blank" spinner section at the bottom about ⅛ inch in length or about equal to the spinner radius. This section has no active membrane thereon but does allow the concentrated RBC to to sweep away from the membrane termination before pooling occurs. This added "dead" zone or "guard" zone improves the efficiency of the device very substantially in most cases, especially with larger pore membranes.

Figure 6:
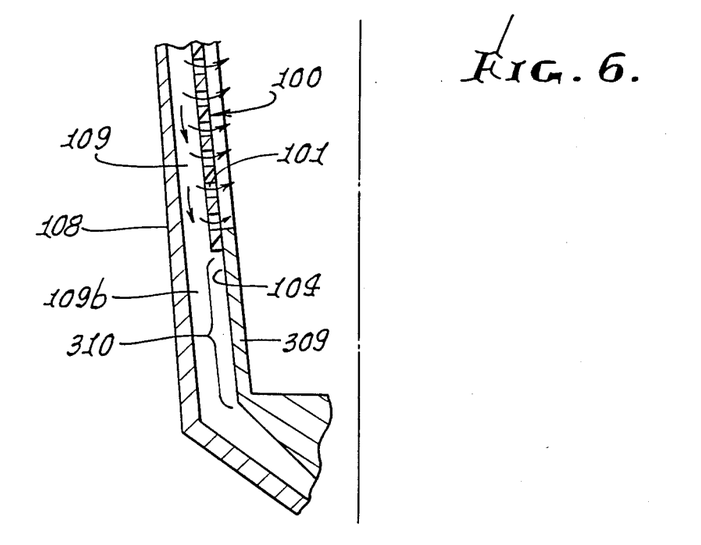
FIG. 6 is a membrane and support structure.

See in this regard FIG. 6 wherein the lower "blank" section 310 of the spinner 309 extends below the membrane pores or holes 101, whereby the RBC pools in gap zone 109b, adjacent blank section 310, i.e. away from the pores. Gap 109 is formed between membrane 100 to shell 108.

At 5.0 μm pore size and above, there is less ability of the RBC to partially block the pores, as they pass through them too easily. Consequently, the local CFV can not be exceeded, even initially, or it will continue to be exceeded and RBC will continue to pass through the pores. One is obliged to either limit the local FV by other means, or also not allow the CFV to fall below the local FV by limiting the increase in concentration. (See below).

2. To limit the increase in concentration, in the pore size range of 5.0 to 8.0 μm and without independent means to limit FV, one limits extraction to about 50% of the available incoming plasma so that the concentration of cells does not increase to such an extent that the CFV would fall below the natural local equilibrium FV. The operative shear rates are in the range of 25,000 to 35,000 sec.$^{-1}$ for the highest to the lowest cell concentrations, respectively, and the net mean FV for the device is about 3.0 cm/min. Other parameters are unaffected.

3. In the range of 8.0 μm to 12.0 μm and without independent means to limit FV, one limits plasma extraction to less than 50%, e.g., 30 to 40%, shear rates remain about 30,000 sec.$^{-1}$, and a net mean FV approaching 6.0 cm/min can be achieved. In this instance there is no natural blocking of the pores by the red cells whatsoever as they pass through such pores, without having to change their shape. Yet the RBC do not pass through these pores in any but insignificant numbers because the CFV can be maintained very high using high shear rate all along the membrane.

4. Given an independent means to limit FV with increasing cell concentration one can utilize pore sizes easily above the size of the retained particle with the higher plasma extraction fractions discussed above. A simple independent means to limit FV as a function of position consists of blocking means to partially block the membrane by selective application of adhesive material. In effect it is made more difficult for plasma to pass through the membrane to an increasing degree downwardly toward the blood exit where concentration of RBC was increased due to the removal of plasma.

5. When one operates the device just below the CFV for red blood cells, smaller formed blood elements can pass through the filter media if the latter's pore size is large enough. The following results are obtained:

At 1.0 μm—All IMG, IGG and large protein molecules, e.g. plasma factors, greater than $10^6$ Daltons pass easily through with the liquid plasma.

At 2.0 μm—Some platelets are found in the filtered plasma.

At 3.0 μm—Significant numbers of platelets approaching donor concentration levels are found in the filtered plasma. Some granulocytes and lymphocyte material is found in the filtered plasma.

At 5.0 μm—A complete spectrum of blood components in significant concentration is found in the filtered plasma whereas the RBC concentration is negligible, e.g. $10^3$ cells/μl. Normal blood concentration is $5\times10^6$ cells/μl.

At 8.0–120 μm—There is little change in the composition of the filtered plasma and, while it is still possible to hold back the RBC, the importance of staying below the CFV for RBC becomes increasingly important and more difficult.

One may state the following and draw the following basic conclusions:

1. The formed elements of blood range in size from giant protein molecules (e.g. $10^6$ to $10^7$ Daltons) at the submicron level to phage which approaches or exceeds the size of RBC in some cases. One important element, the platelet, is, roughly speaking, the same shape as a red cell but is only 2 to 3 μm diameter, whereas the red cell is about 7 to 8 μm diameter. Both are disc shaped. The red cell is $87\times10^9$ μl in volume, in average, and the platelet is $6\times10^9$ μl. All else being equal, (most importantly—cell concentration in the blood to be filtered) the CFV for RBC is $(87/6)^{\frac{2}{3}}$ or about 6 times greater than for platelets. Clearly, if one operates just below the CFV for RBC, significant numbers of platelets, for which the CFV is greatly exceeded, will impinge the membrane. Even if the CFV is exceeded by only 20%, significant numbers of particles suffering that condition will be brought to the membrane. If they can plug the membrane, they will; if they can pass through it, they will.

2. If one wants cell free, i.e. platelet and larger, plasma, but plasma rich in all plasma proteins and factors, the optimum pore size is 1.0 to 2.0 μm. Platelet rich plasma can be obtained using the pore size range 3.0 to 5.0 μm with 3.0 μm being best to hold back most of the "white" blood cells along with the "red". The range of 5.0 to 8.0 μm can be used to pass particles having a volume less than $50\times10^9$ μl while holding back RBC.

3. The best filter medium to use when selectively passing formed blood elements is the thinnest possible membrane sheet (e.g. from 6 to 25 μm thick) with straight-through pores. That is, the least filter medium surface area contacting blood elements per unit of open volume is best in order to minimize interaction with the blood elements. The tortuous path filter medium is undesirable for this reason. The Nuclepore polycarbonate membrane is an example of the more ideal filter medium geometry and structure.

4. Below 1.0 μm, e.g. 0.4 to 0.8 μm, pore size, the various formed elements and plasma proteins smaller than RBC which are impinging the membrane exhibit a strong tendency not only to enter or cover a pore, but to remain there as well. This appears to be due, at least in part, to a tendency for the membrane substrate to swell and, at least partially, close the pore, trapping whatever is lodged there. At 1.0 μm and above, this tendency is no longer evident. The obvious benefit is that the larger pore size membrane avoids plugging. In prior art, these pore sizes were not suitable because, above the CFV at which they were compelled to operate, RBC would pass too easily, with consequent hemolysis, at the TMP needed by such devices to pass sufficient plasma across the polarized layer.

Figure 7:
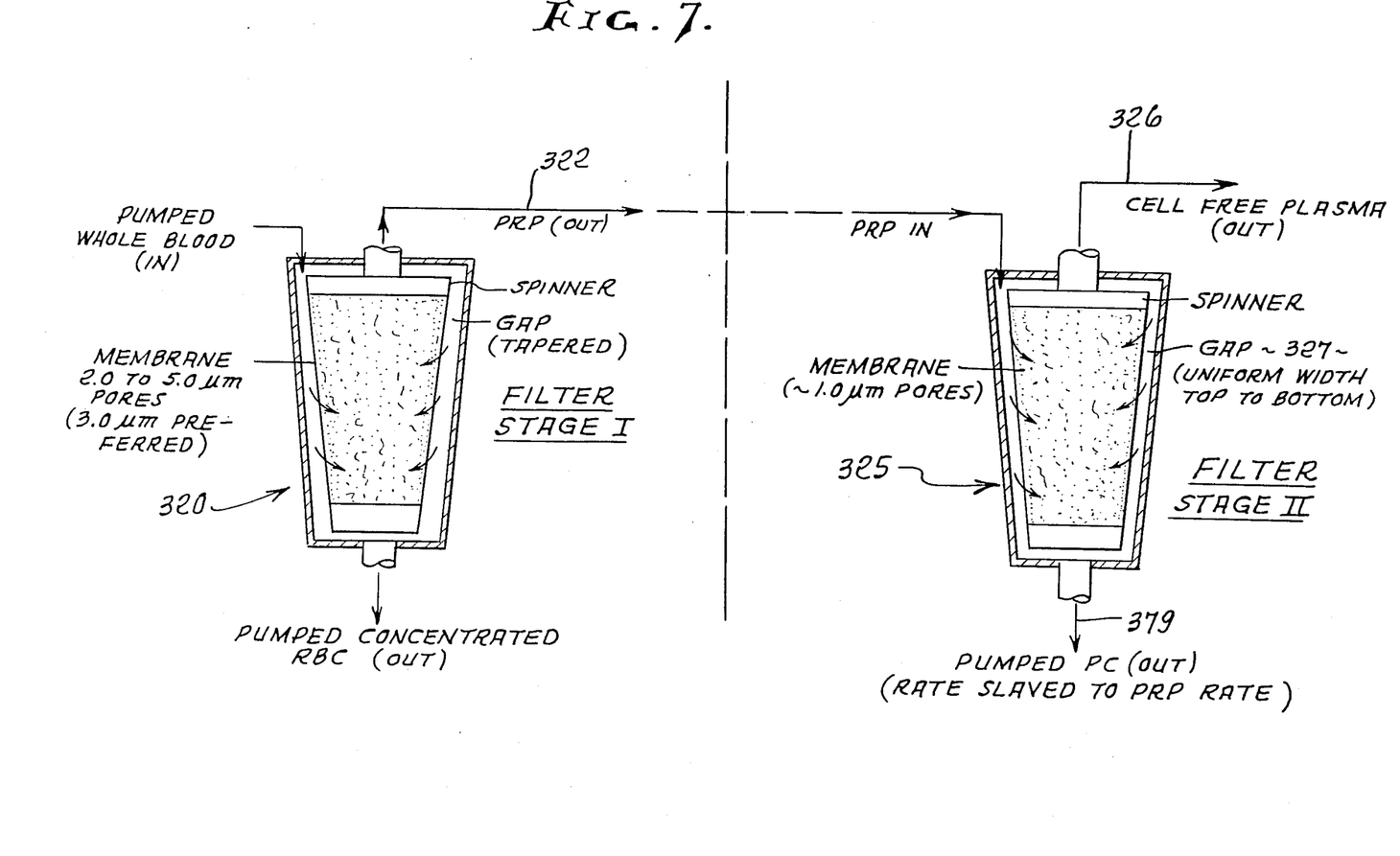
FIGS. 7-10 are system flow diagram.

The following are several useful and important blood filtration applications utilizing the above discoveries:

1. Platelet Rich Plasma (PRP) and Platelet Concentrate (PC). Consider the fact that PRP can be obtained with a device like that of FIG. 2, seen at 320 in FIG. 7 (Stage I) using a membrane pore size of 2.0 to 5.0 μm with 3.0 μm being preferred. See PRP output stream 322. PC can be extracted from PRP stream 322 in a second stage of filtration using a similar device 325. See PC output stream 326. Because of the absence of RBC, in device 325, much higher shear rates are usable e.g. to $10^5$ sec.$^{-1}$, and the width of gap 327 may be uniform along the length of the membrane. The second stage uses a 1.0 μm thick membrane 328 to extract cell free plasma from the PRP. What is left behind or pumped out at 329 is valuable PC. This procedure utilizes two separate devices, as shown in FIG. 7.

Figure 8:
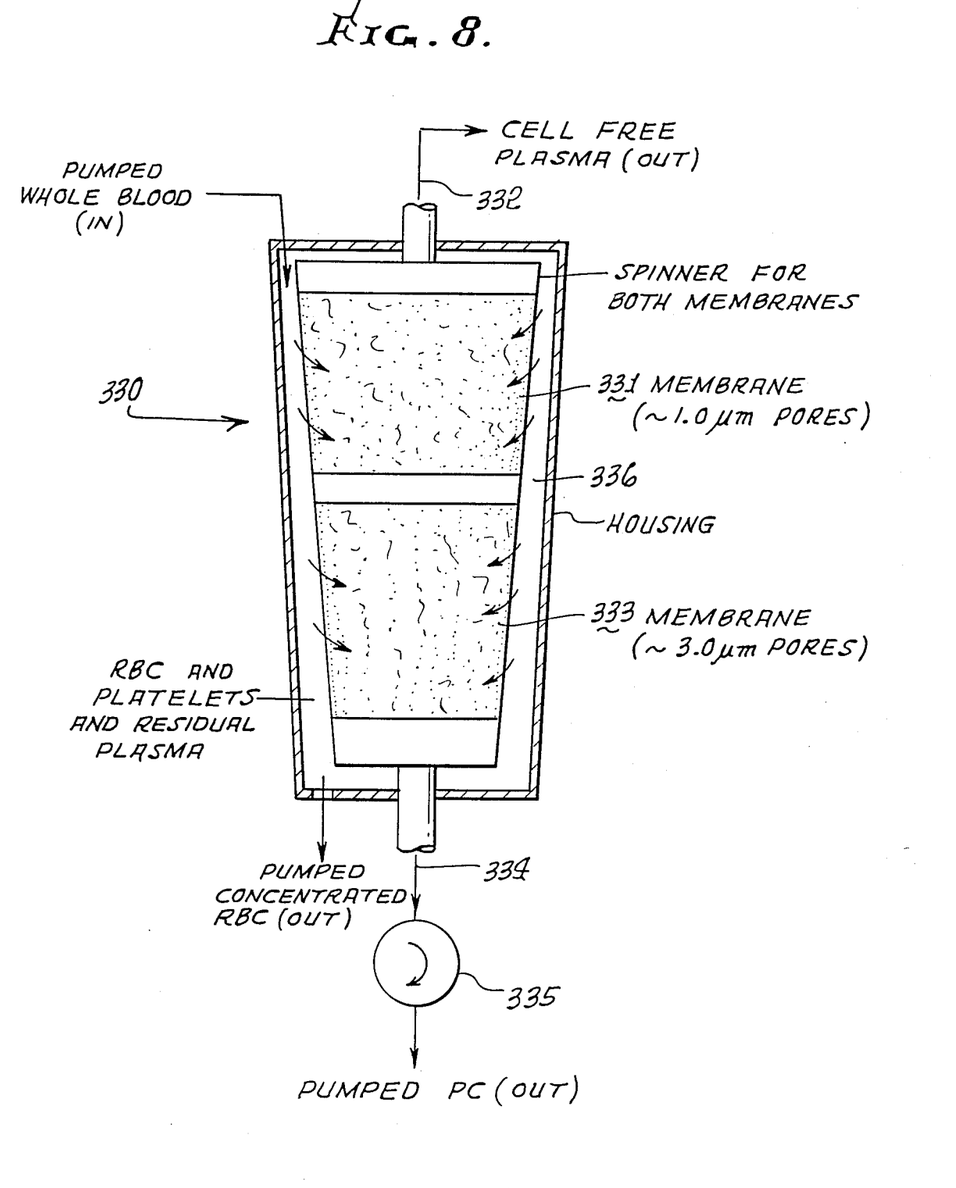

Another way to accomplish the same thing with a single device 330 is shown in FIG. 8. The first and upper membrane at 331 has 1.0 μm pores, through which cell-free plasma passes at 332 (out of the device at one end). What is left behind is concentrated RBC and PC (concentrated by a factor of 5/1 if 80% of the plasma is, for example, removed). The second and lower membrane 333 on the same spinner has pores of 3.0 μm size, and can pass PC to and through a separate manifold at the other end of the device. See output stream 334. The withdrawal rate via pump 335 must be carefully controlled so as not to pull RBC through the second membrane, that is, so that the FV over the second membrane does not exceed the CFV corresponding to the concentration of cells there. This is accomplished by means of positive displacement pump 335 on the outlet of the PC line. Note that tapered gap 336, as shown, extends all the way from membrane 331 to membrane 333 and increases in thickness over that range. In both FIGS. 7 and 8, all membranes are rotated.

2. "White" cell rich Plasma (WRP) or White Cell concentrate (WC). The same configurations as described above, FIGS. 7 and 8, can be used for collecting plasma rich in lymphocytes and other cellular material, yet, absent RBC. Pore sizes would be in the range of 5.0 μm to 8.0 μm, for this purpose. The value of WRP or WC is in therepeutic applications for the treatment of blood diseases including research in several cancers and AIDS.

3. CELL (RBC) Washing and Concentrating

Cell washing and concentrating has use in reconstituting stored frozen blood and in intraoperative blood salvage and autotransfusion. Frozen RBC is stored in ethylene glycol to prevent crystalization damage i.e., antifreeze which is toxic and must be washed out before the cells can be transfused. Intraoperative salvage draws its blood from the surgical field, e.g. cardiotomy suction, or from machines employing extra-corporeal blood circulation, e.g. oxygenators. These sources of blood have three things in common: 1. They contain debris, clot material, fatty and cellular aggregates and micro-emboli of various types ranging in size generally from about 15 to 20 μm for the smaller specie to very large fibrin clots and bone chips. 2. They contain toxic fluids, e.g., antifreeze for stored cells to seriously hemolyzed plasma/saline mixtures for salvaged blood; and 3. They sometimes need to have fluid volume removed to increase RBC concentration.

These three problems can be solved as follows: Step I. Removal of all particles of size greater than 12 to 15 μm. Here, reliance is placed on the discovery that RBC will pass through pores greater than 8 μm without hemolysis or latent damage. The salvaged or stored blood is first passed through a static filter as seen at 340 in FIG. 9, designed only to operate as a crude clot strainer. Static filters that attempt to hold back particles down to 15 to 20 μm tend to plug up, or load up with consequent particle breakthrough, too quickly, and must be frequently substituted during the procedure.

Figure 9:
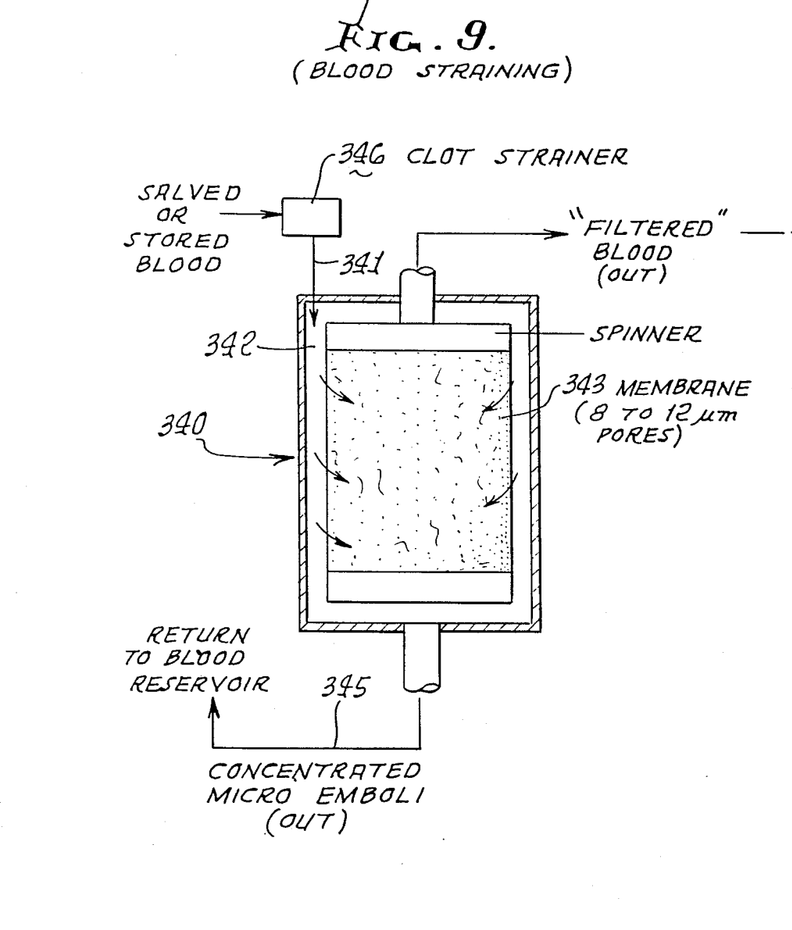

The crudely strained blood in stream 341 enters the gap 342 adjacent membrane 343 of the device, which does not need variable gap spacing because cell concentration does not change from entrance to exit. The spinning membrane 343 has a pore size range of 8 to 12 μm and the device is operated at a CFV just below that for 12 to 15 μm particles so that RBC, at 7 to 8 μm, will pass easily through the pores, leaving all micro-emboli behind. What exits the device at the top, as seen at 344 in FIG. 9, is "filtered" blood. What leaves at the bottom 345 is residual blood containing concentrated micro-emboli. Each cycle through the device should be able to filter 80 to 90% of the incoming blood. The residual blood containing the debris flows out at 20 to 10% of the incoming blood rate, respectively, and is returned to the salvaged blood reservoir, to be recycled and refiltered. As micro-emboli are concentrated in this way they have a strong tendency to aggregate into larger particles. Eventually they are caught in the clot strainer, 346.

Step II. Cell Washing

Figure 10:
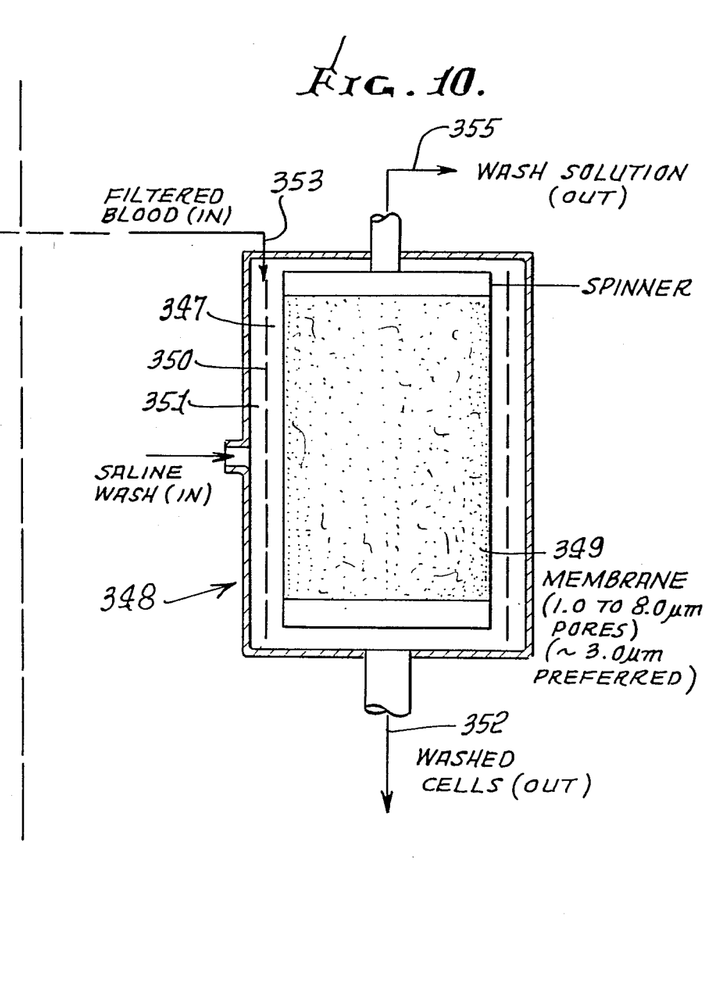

The filtered blood 344 enters gap 347 in a unique device 348 shown in FIG. 10. In this device the "gap" 347 is defined by the space between the spinner membrane 349 and a porous wall 350 through which a saline wash solution is passed into the blood. The saline is distributed uniformly over the porous surface by means of an entry plenum 351 behind the porous wall. Consequently, the blood is being constantly diluted by fresh saline flowing through wall 350 into gap 347 and concomitantly reconcentrated as the saline and ever more dilute, toxic fluid passes through the membrane. If washed cells are pumped out (see 352) at the bottom of gap 347 at the same volumetric rate as filtered blood is pumped in at the top (see 353), there will be no net change in concentration of cells and gap width changes are not necessary. On the other hand, filtered cells entering at the top of gap 347 in a toxic solution see that solution continuously substituted with saline as the cells proceed toward the bottom. The saline wash inflow rate is selected to assure negligible toxic concentration at the washed cells outlet 355. The membrane has a pore size of from 1.0 to 8.0 μm. The latter helps to assure removal of all particles smaller than RBC, but generally, micro-debris remaining in "filtered" blood consists of cellular debris less than 3.0 μm in size. There is little point in trying to retain platelets below 3.0 μm because neither stored blood nor salvaged blood ever contains significant numbers of platelets. Therefore, a pore size of 3.0 μm will get rid of most cellular debris and work more efficiently than 8.0 μm.

Step III. Concentrating

The final step merely feeds the washed cells into a device like that shown in FIG. 7, but with a membrane having pore size of 1.0 to 3.0 μm to get the most efficient concentration rates, a pore size of 2.0 μm appears best for this purpose. Steps I thru III comprise a complete RBC recovery system. Steps II and III can be combined into one device in a fashion similar to that shown in FIG. 8.

The above devices are intended to show how blood filtration using large pores and CFV selectively by size can be very useful.

Figure 11:
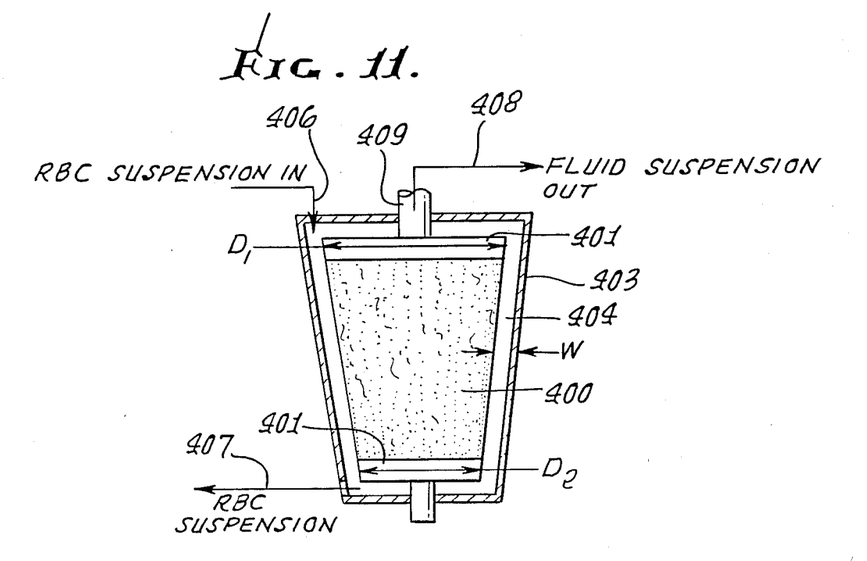
FIG. 11 is a view of a modification.

Reference is now made to FIG. 11, showing a tapered porous membrane 400, like membrane 100 in FIG. 1, on a frustoconical, concentric, support or spinner 401 like support 104. (Alternatively, the membrane 400 may be like that seen at 18 on spinner 14, in FIG. 21. Tapered casing 403 surrounds the membrane, and a gap 404 is provided between the membrane outer surface, or side, and the inner surface of the casing. The gap is annular, but its width "w" remaining contact in a direction axially lengthwise of the membrane between whole blood supply upper entrance 406 to the gap, and lower outlet 407 from the gap, for the concentrated red blood suspension. It therefore is like gap 327 in FIG. 7. The filtered portion of the suspension 408 passed through the membrane leaves the interior of the spinner, axially, at outlet 409. The diameter $D_1$ of the membrane near entrance 406 divided by the diameter $D_2$ of the membrane near outlet 407 is:

$$D_1/D_2 \geqq 1.65$$

Such a uniform width gap, in a tapered construction is useful when the shear rode reduction needed to maintain an essentially uniform shear stress is not too great. Such a construction is useful in certain applications, as for example as follows:

1. In plasma harvesting, when the percentage of incoming plasma is 50% or less;
2. In cell washing, when the cell concentration is not very great;
3. In correction of specific components, wherein only a relatively small amount of fluid is corrected.

The net amount of suspending fluid (as for example plasma) removed at 408 is not so great as to produce a very large increase in suspension viscosity. Consequently, the compensating decrease in shear rate required to maintain a constant shear stress is also not so great. It can be accomplished merely by reducing the diameter of the spinner 401, thus reducing the surface velocity. A change of gap width can be used as well, but is not required.

We claim:

1. In the method of separating blood plasma from particles including blood cells, in the blood, the steps that include:
   (a) providing a membrane with holes therethrough of a size to pass the particulate, and supplying blood to one side of the membrane,
   (b) moving the membrane at sufficiently high velocity that shear conditions created in the blood adjacent the membrane cause particles in the blood to move or remain away from the surface of the membrane and from said holes,
   (c) creating a pressure differential across the membrane sufficient to cause plasma to pass through the holes from said one side of the membrane to the opposite side thereof,
   (d) the holes being allowed to reduce in cross-sectional area as by protein collection on the membrane at the holes, or by expansion of the membrane material, and the holes maintained sufficiently open, by virtue of their original size, to continue to pass the plasma therethrough,
   (e) platelet rich plasma being passed through the holes of the membrane,
   (f) providing a second moving membrane and supplying platelet rich plasma to one side of the second membrane,
   (g) the second membrane having holes therethrough of a size to pass plasma and to prevent passage of platelets,
   (h) whereby a platelet concentrate is produced at said one side of the second membrane.

2. The method of claim 1 wherein said two membranes are rotated about separate axes.

3. The method of claim 1 wherein said two membranes are rotated coaxially.

4. An apparatus for filtering blood, comprising:
   (a) a first surface of revolution,
   (b) a membrane comprising a second surface of revolution spaced from the first surface and defining therewith a gap of predetermined dimensions and geometry between the surfaces, the membrane containing through openings of nominal cross dimensions in excess of 0.9 microns,
   (c) inlet means for introducing blood into the gap,
   (d) means for rotating one of said surfaces about its axis of revolution relative to the other surface at an angular velocity such that shear stress, uniform over the membrane surface, is imposed on blood in the gap and laminar flow of the suspension in the gap is created whereby plasma is separated from the blood in the gap and passes through the membrane openings, and red cells in the blood are prevented from passing through the openings, and
   (e) first outlet means for collecting fluid passing through the membrane,
   (f) platelet rich plasma being passed through the holes of said membrane,
   (g) a second rotating membrane and a gap at one side thereof to which the platelet rich plasma is supplied,
   (h) the second membrane having holes therethrough of a size to pass plasma but to prevent passage of platelets,
   (i) whereby a platelet concentrate is produced in said gap.

5. Apparatus as defined in claim 4 wherein the two membranes have separate axes of rotation.

6. Apparatus as defined in claim 4 wherein the two membranes have a common axis of rotation.

7. The method of obtaining a platelet concentrate from raw blood, that includes
   (a) providing a first membrane with holes therethrough of a size to pass red blood cells, and supplying blood to one side of that membrane,
   (b) moving the membrane at sufficiently high velocity that shear conditions created in the blood adjacent the membrane cause particles in the blood to move or remain away from the surface of the membrane and from said holes,
   (c) creating a pressure differential across the membrane sufficient to cause plasma to pass through the holes from said one side of the membrane to the opposite side thereof, said plasma being platelet rich, (d) providing a second moving membrane and supplying the platelet rich plasma to one side of the second membrane, (e) the second membrane having holes therethrough of a size to pass plasma and to prevent passage of platelets, (f) whereby a platelet concentrate is produced at said one side of the second membrane.

* * * * *